(12) United States Patent
Scott et al.

(10) Patent No.: US 8,332,296 B1
(45) Date of Patent: Dec. 11, 2012

(54) SYSTEM FOR DETERMINING ELECTION REAUTHORIZATION

(75) Inventors: Dale Scott, San Francisco, CA (US); Robert Leonard, San Francisco, CA (US)

(73) Assignee: Dale Scott & Company, Inc., San Francisco, CA (US)

( * ) Notice: Subject to any disclaimer, the term of this patent is extended or adjusted under 35 U.S.C. 154(b) by 0 days.

(21) Appl. No.: 13/245,712

(22) Filed: Sep. 26, 2011

Related U.S. Application Data (63) Continuation of application No. 13/109,955, filed on May 17, 2011.

(51) Int. Cl.
*G06Q 40/00* (2012.01)

(52) U.S. Cl. .......................................................... 705/35
(58) Field of Classification Search ............... 705/35–45
See application file for complete search history.

(56) References Cited

PUBLICATIONS

KNN public finance. Annual Review 2010.

*Primary Examiner* — Thomas M Hammond, III
(74) *Attorney, Agent, or Firm* — Van Pelt, Yi and James LLP (57) ABSTRACT

Determining election reauthorization is disclosed, including using a system to: receive one or more inputs of values, determine an available cash flow based at least in part on the inputted values; determine whether a reauthorization of bonds is required based at least in part on the determined available cash flow; and determine that an aggregate of an amount of bonds issued so far and an amount of bonds to reauthorize does not exceed a limit associated with a bonding capacity associated with a state statute.

18 Claims, 10 Drawing Sheets

| June 6, 2006 Election - Prop 39 | | |
|---|---|---|
| Total Authorization | $ | 42,000,000.00 |
| 2006 Election, Series A | | 6,000,000.00 |
| 2006 Election, Series B | | 9,720,000.00 |
| 2006 Election, Series C | | 9,500,000.00 |
| 2006 Election, Series D | | 9,000,000.00 |
| Remaining Authorization | $ | 7,780,000.00 |

FIG. 5

| 2006 AUTHORIZATION | | | | | | | | | |
|---|---|---|---|---|---|---|---|---|---|
| | 2006 Election Series A | | | | 2006 Election Series B | | | | |
| | CIB | | CAB | | CIB | | Total | Total Fiscal | Total Annual |
| Date | Principal | Interest | Principal | Interest | Principal | Interest | Debt Service | Debt Service | Debt Service |
| Feb-1-2011 | - | 129,841.25 | - | - | - | - | 948,721.25 | | |
| Aug-1-2011 | 125,000.00 | 129,841.25 | - | - | - | 212,300.00 | 1,292,646.25 | 2,241,367.50 | 2,241,367.50 |
| Feb-1-2012 | - | 125,466.25 | - | - | - | 212,300.00 | 766,796.25 | | |
| Aug-1-2012 | 135,000.00 | 125,466.25 | - | - | 160,000.00 | 206,700.00 | 1,371,796.25 | 2,138,592.50 | 2,138,592.50 |
| Feb-1-2013 | - | 120,741.25 | - | - | - | 206,700.00 | 749,121.25 | | |
| Aug-1-2013 | 140,000.00 | 120,741.25 | - | - | 180,000.00 | 200,400.00 | 1,394,121.25 | 2,143,242.50 | 2,143,242.50 |
| Feb-1-2014 | - | 115,841.25 | - | - | - | 200,400.00 | 730,033.75 | | |
| Aug-1-2014 | 145,000.00 | 115,841.25 | - | - | 190,000.00 | 193,750.00 | 1,405,033.75 | 2,135,067.50 | 2,135,067.50 |
| Feb-1-2015 | - | 110,766.25 | - | - | - | 193,750.00 | 710,008.75 | | |
| Aug-1-2015 | 150,000.00 | 110,766.25 | 22,000.00 | 11,587.56 | 200,000.00 | 186,750.00 | 1,420,008.75 | 2,130,017.50 | 2,130,017.50 |
| Feb-1-2016 | - | 105,516.25 | - | - | - | 186,750.00 | 691,608.75 | | |
| Aug-1-2016 | 150,000.00 | 105,516.25 | - | - | 215,000.00 | 179,225.00 | 1,441,608.75 | 2,133,217.50 | 2,133,217.50 |
| Feb-1-2017 | - | 100,266.25 | - | - | - | 179,225.00 | 672,033.75 | | |
| Aug-1-2017 | 165,000.00 | 100,266.25 | - | - | 230,000.00 | 171,175.00 | 1,472,033.75 | 2,144,067.50 | 2,144,067.50 |
| Feb-1-2018 | - | 96,141.25 | - | - | - | 171,175.00 | 655,546.25 | | |
| Aug-1-2018 | 170,000.00 | 96,141.25 | - | - | 245,000.00 | 165,662.50 | 1,495,546.25 | 2,151,092.50 | 2,151,092.50 |
| Feb-1-2019 | - | 92,741.25 | - | - | - | 165,662.50 | 638,671.25 | | |
| Aug-1-2019 | 175,000.00 | 92,741.25 | 10,000.00 | 5,234.21 | 275,000.00 | 160,562.50 | 1,528,671.25 | 2,167,342.50 | 2,167,342.50 |
| Total | 1,355,000.00 | 1,994,642.50 | 32,000.00 | 16,821.77 | 1,950,000.00 | 3,353,050.00 | 19,384,007.50 | 19,384,007.50 | 19,384,007.50 |

FIG. 6

| Year | Local Secured | Utility | Unsecured | Total | Actual Growth | Projected |
|---|---|---|---|---|---|---|
| 1997 | | | | 1,680,702,429 | | |
| 1998 | | | | 1,762,244,418 | 4.85% | |
| 1999 | | | | 1,884,041,574 | 6.91% | |
| 2000 | | | | 2,011,967,841 | 6.79% | |
| 2001 | | | | 2,209,242,468 | 9.81% | |
| 2002 | | | | 2,442,255,800 | 10.55% | |
| 2003 | | | | 2,611,901,757 | 6.95% | |
| 2004 | | | | 2,794,207,430 | 6.98% | |
| 2005 | | | | 3,017,318,486 | 7.98% | |
| 2006 | | | | 3,259,218,850 | 8.02% | |
| 2007 | | | | 3,609,136,044 | 10.74% | |
| 2008 | | | | 3,847,028,538 | 6.59% | |
| 2009 | 3,999,831,065 | 593,973 | 46,411,719 | 4,046,836,757 | 5.19% | |
| 2010 | 4,029,754,173 | 593,715 | 42,837,900 | 4,073,185,788 | 0.65% | |
| 2011 | 3,927,213,867 | 594,668 | 41,708,699 | 3,969,517,234 | -2.55% | |
| 2012 | 3,927,213,867 | 594,668 | 41,708,699 | 3,969,517,234 | | 0.00% |
| 2013 | 3,927,213,867 | 594,668 | 41,708,699 | 3,969,517,234 | | 0.00% |
| 2014 | 4,005,758,144 | 606,561 | 42,542,873 | 4,048,907,579 | | 2.00% |
| 2015 | 4,125,930,889 | 624,758 | 43,819,159 | 4,170,374,806 | | 3.00% |
| 2016 | 4,249,708,815 | 643,501 | 45,133,734 | 4,295,486,050 | | 3.00% |
| 2017 | 4,377,200,080 | 662,806 | 46,487,746 | 4,424,350,632 | | 3.00% |
| 2018 | 4,508,516,082 | 682,690 | 47,882,378 | 4,557,081,151 | | 3.00% |
| 2019 | 4,643,771,565 | 703,171 | 49,318,850 | 4,693,793,585 | | 3.00% |
| 2020 | 4,783,084,712 | 724,266 | 50,798,415 | 4,834,607,393 | | 3.00% |

FIG. 7

California State Unified School District Bonding Capacity: 2.5%

| Before | Assessed Valuation | Gross Bonding Capacity | Outstanding Principal | Net Remaining Bonding Capacity |
|---|---|---|---|---|
| Feb-1-2005 | 3,017,318,486 | 75,432,962 | 45,965,000.00 | 29,467,962 |
| Aug-1-2005 | 3,017,318,486 | 75,432,962 | 45,965,000.00 | 29,467,962 |
| Feb-1-2006 | 3,259,218,850 | 81,480,471 | 45,795,000.00 | 35,685,471 |
| Aug-1-2006 | 3,259,218,850 | 81,480,471 | 45,795,000.00 | 35,685,471 |
| Feb-1-2007 | 3,609,136,044 | 90,228,401 | 45,556,000.00 | 44,672,401 |
| Aug-1-2007 | 3,609,136,044 | 90,228,401 | 45,556,000.00 | 44,672,401 |
| Feb-1-2008 | 3,847,028,538 | 96,175,713 | 45,341,000.00 | 50,834,713 |
| Aug-1-2008 | 3,847,028,538 | 96,175,713 | 45,341,000.00 | 50,834,713 |
| Feb-1-2009 | 4,046,836,757 | 101,170,919 | 45,106,000.00 | 56,064,919 |
| Aug-1-2009 | 4,046,836,757 | 101,170,919 | 45,106,000.00 | 56,064,919 |
| Feb-1-2010 | 4,073,185,788 | 101,829,645 | 44,561,000.00 | 57,268,645 |
| Aug-1-2010 | 4,073,185,788 | 101,829,645 | 44,561,000.00 | 57,268,645 |
| Feb-1-2011 | 3,969,517,234 | 99,237,931 | 43,971,000.00 | 55,266,931 |
| Aug-1-2011 | 3,969,517,234 | 99,237,931 | 43,971,000.00 | 55,266,931 |
| Feb-1-2012 | 3,969,517,234 | 99,237,931 | 43,140,000.00 | 56,097,931 |
| Aug-1-2012 | 3,969,517,234 | 99,237,931 | 43,140,000.00 | 56,097,931 |
| Feb-1-2013 | 3,969,517,234 | 99,237,931 | 42,205,000.00 | 57,032,931 |
| Aug-1-2013 | 3,969,517,234 | 99,237,931 | 42,205,000.00 | 57,032,931 |
| Feb-1-2014 | 4,048,907,579 | 101,222,689 | 41,220,000.00 | 60,002,689 |
| Aug-1-2014 | 4,048,907,579 | 101,222,689 | 41,220,000.00 | 60,002,689 |
| Feb-1-2015 | 4,170,374,806 | 104,259,370 | 40,185,000.00 | 64,074,370 |
| Aug-1-2015 | 4,170,374,806 | 104,259,370 | 40,185,000.00 | 64,074,370 |

FIG. 8

Tax rate cap: $60 (per each $100,000 of assessed valuation) for the 2006 Election Authorization

| Date | Tax Collection | Prior Reserve | Net Tax Reqt | Unsecured Collection | Net Secured Collection | Net Secured | Net Unsecured | Tax Rate | Net Remaining Tax | Available Debt Service |
|---|---|---|---|---|---|---|---|---|---|---|
| Feb-1-2011 | | | | | | | | | | |
| Aug-1-2011 | 3,431,238.75 | 1,292,646.25 | 2,138,592.50 | 23,622.35 | 2,114,970.15 | 3,927,213,867 | 41,708,699 | 53.85 | $6.15 | 241,678.38 |
| Feb-1-2012 | | | | | | | | | | |
| Aug-1-2012 | 3,515,038.75 | 1,371,796.25 | 2,143,242.50 | 22,458.49 | 2,120,784.01 | 3,927,213,867 | 41,708,699 | 53.99 | $6.01 | 235,865.40 |
| Feb-1-2013 | | | | | | | | | | |
| Aug-1-2013 | 3,529,188.75 | 1,394,121.25 | 2,135,067.50 | 22,970.63 | 2,112,096.87 | 4,005,758,144 | 42,542,873 | 52.72 | $7.28 | 291,677.79 |
| Feb-1-2014 | | | | | | | | | | |
| Aug-1-2014 | 3,535,051.25 | 1,405,033.75 | 2,130,017.50 | 23,100.82 | 2,106,916.68 | 4,125,930,889 | 43,819,159 | 51.06 | $8.94 | 368,960.84 |
| Feb-1-2015 | | | | | | | | | | |
| Aug-1-2015 | 3,553,226.25 | 1,420,008.75 | 2,133,217.50 | 23,044.16 | 2,110,173.34 | 4,249,708,815 | 45,133,734 | 49.65 | $10.35 | 439,971.43 |
| Feb-1-2016 | | | | | | | | | | |
| Aug-1-2016 | 3,585,676.25 | 1,441,608.75 | 2,144,067.50 | 23,079.78 | 2,120,987.72 | 4,377,200,080 | 46,487,746 | 48.45 | $11.55 | 505,653.45 |
| Feb-1-2017 | | | | | | | | | | |
| Aug-1-2017 | 3,623,126.25 | 1,472,033.75 | 2,151,092.50 | 23,198.06 | 2,127,894.44 | 4,508,516,082 | 47,882,378 | 47.19 | $12.81 | 577,537.37 |

FIG. 9

| Date | Annual Debt Service | Coupon | Principal | Interest | Total Debt Service | Fiscal Debt Service | Annual Year Debt Service | Estimated TIC | Calculated TIC |
|---|---|---|---|---|---|---|---|---|---|
| Feb-12 | | | | 229,528.33 | 229,528.33 | 229,528.33 | | 222,094.51 | 222,843.54 |
| Aug-12 | 241,678.38 | 3.000% | -160,000 | 172,146.25 | 12,146.25 | | 241,674.58 | 11,466.21 | 11,533.97 |
| Feb-13 | | | | 174,546.25 | 174,546.25 | 186,692.50 | | 160,754.93 | 162,113.76 |
| Aug-13 | 235,865.40 | 3.000% | -115,000 | 174,546.25 | 59,546.25 | | 234,092.50 | 53,503.76 | 54,092.44 |
| Feb-14 | | | | 176,271.25 | 176,271.25 | 235,817.50 | | 154,521.01 | 156,616.12 |
| Aug-14 | 291,677.79 | 3.000% | 65,000 | 176,271.25 | 111,271.25 | | 287,542.50 | 95,162.35 | 96,696.50 |
| Feb-15 | | | | 177,246.25 | 177,246.25 | 288,517.50 | | 147,888.83 | 150,652.95 |
| Aug-15 | 368,960.84 | 3.000% | 15,000 | 177,246.25 | 192,246.25 | | 369,492.50 | 156,492.07 | 159,820.05 |
| Feb-16 | | | | 177,021.25 | 177,021.25 | 369,267.50 | | 140,584.03 | 143,936.72 |
| Aug-16 | 439,971.43 | 3.000% | 90,000 | 177,021.25 | 267,021.25 | | 444,042.50 | 206,886.69 | 212,356.14 |
| Feb-17 | | | | 175,671.25 | 175,671.25 | 442,692.50 | | 132,789.44 | 136,644.61 |
| Aug-17 | 505,653.45 | 3.500% | 155,000 | 175,671.25 | 330,671.25 | | 506,342.50 | 243,857.11 | 251,571.27 |
| Feb-18 | | | | 172,958.75 | 172,958.75 | 503,630.00 | | 124,439.33 | 128,700.42 |
| Aug-18 | 577,537.37 | 3.500% | 235,000 | 172,958.75 | 407,958.75 | | 580,917.50 | 286,356.81 | 296,911.13 |
| Feb-19 | | | | 168,846.25 | 168,846.25 | 576,805.00 | | 115,626.88 | 120,191.69 |
| Aug-19 | 642,518.65 | 4.000% | 305,000 | 168,846.25 | 473,846.25 | | 642,692.50 | 316,578.18 | 329,908.33 |
| Feb-20 | | | | 162,746.25 | 162,746.25 | 636,592.50 | | 106,079.30 | 110,825.48 |
| Aug-20 | 653,997.43 | 4.000% | 330,000 | 162,746.25 | 492,746.25 | | 655,492.50 | 313,342.37 | 328,189.57 |
| Total | 3,957,861 | | 790,000 | 3,172,290 | 3,962,290 | 3,469,543 | 3,962,290 | 2,988,424 | 3,073,605 |

FIG. 10

SYSTEM FOR DETERMINING ELECTION REAUTHORIZATION

CROSS REFERENCE TO OTHER APPLICATIONS

This application is a continuation of co-pending U.S. patent application Ser. No. 13/109,955, entitled SYSTEM FOR DETERMINING ELECTION REAUTHORIZATION filed May 17, 2011 which is incorporated herein by reference for all purposes.

BACKGROUND OF THE INVENTION

In California, school districts and community college districts that wish to issue general obligation bonds usually require a two-thirds (approximately 66.67%) approval vote during an election. Elections to approve general obligation bonds by a two-thirds vote can be held on most any Tuesdays. In 2000, California's voters passed Proposition 39, which lowered the voter approval threshold for school district and community college district general obligation bonds from two-thirds voter approval to 55% voter approval. Once authorized, general obligation bonds can be issued (e.g., sold to an underwriter for later resale). However, before issuing a general obligation bond authorized under the Proposition 39 procedures, the bond must meet certain criteria.

BRIEF DESCRIPTION OF THE DRAWINGS

Various embodiments of the invention are disclosed in the following detailed description and the accompanying drawings.

FIG. 6 is a spreadsheet showing examples of payment schedules of debt service on issued bonds in accordance with some embodiments.

FIG. 8 is a spreadsheet showing an example of calculating bonding capacity in accordance with some embodiments.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining whether a reauthorization of bonds is required is disclosed. The system comprises a processor and a memory. One or more inputs of values (e.g., property valuations, a tax rate cap) are received. An available cash flow is determined based at least in part on inputted values (e.g., cash flow associated with bonds issued so far). Whether a reauthorization of bonds is required is determined based at least in part on the determined available cash flow. The memory is coupled to the processor and configured to provide the processor with instructions.

General obligation bonds (hereinafter referred to as "bonds") can be sold by municipalities (e.g., school districts and community college districts) to investors. For example, bond proceeds can be used by the school districts to finance certain projects or acquisitions of property. The investors are then paid back in principal and interest over time. In various embodiments, debt service refers to the principal and interest that is owed to the investors by the entity (e.g., a school or community college district) that issued (e.g., sold) the bonds. In various embodiments, tax revenue is used to pay debt service. Generally, an amount of bonds (e.g., $100 million) is authorized by voting during an election. Portions of the total amount of authorized bonds may be sold over time (e.g., as the money is needed by the issuing entity), although not all of the authorized bonds need to be sold.

In 2000, California's voters passed Proposition 39 (hereinafter referred to as "Prop 39"), which lowered the voter approval threshold for school district and community college district general obligation bonds from two-thirds (⅔) voter approval to 55% voter approval. Prop 39 amended the California Constitution to allow for the levy of ad valorem taxes on real property in excess of the one percent (1%) limit to pay debt service on bonds issued for school construction with the approval of 55% of the votes cast. Prop 39 does not replace existing law that provides for the issuance of general obligation bonds approved by a two-thirds vote; rather, a school district could elect to authorize general obligation bonds by either the Prop 39 procedures or the two-thirds vote procedures. The issuance procedure for bonds authorized at an election requiring only 55% voter approval (rather than two-thirds) was enacted by Assembly Bill 1908 (AB 1908).

However, bonds authorized at an election requiring only 55% voter approval entail a few restrictions. A first restriction is that 55% voter approval bond elections are limited to (1) statewide primary or general elections; (2) regularly scheduled local elections; or (3) statewide special elections. Consequently, barring a case of a special statewide election (which, for example, can only be called by the Governor in California), districts may only hold 55% elections on regularly scheduled local election dates and statewide elections held in March and November of even-numbered years. This is in contrast to bond elections using the two-thirds approval procedures, which may be held on almost any Tuesday of the year.

A second restriction is that districts must reasonably project that a property tax levy (e.g., tax rate) needed to pay debt service on the bonds will not exceed a certain soft tax rate cap (which varies by the type of district) for each hundred thousand dollars ($100,000) of assessed value of taxable property. Non-unified school districts have a tax rate cap of $30 per each $100,000 of assessed value of taxable property, unified school districts have a tax rate cap of $60 per each $100,000 of assessed value of taxable property, and community college districts have a tax rate cap of $25 per each $100,000 of assessed value of taxable property. Put another way, a district may only issue bonds using the 55% voter approval procedure if the district projects, at the time of issuance of the bonds, that the tax rate needed to pay debt service on the bonds will not exceed the applicable soft tax rate cap (e.g., $60 per $100,000 for unified school districts, $30 per $100,000 for elementary and high districts and $25 per $100,000 for community college districts).

In some embodiments, the tax revenue that is used to pay debt service on issued bonds is based on assessed valuation of property within the school district that issued the bonds. So, as projections of assessed values of property fluctuate, the tax rate (per each $100,000 of property valuation) may be adjusted to pay for the debt service (i.e., a decrease in property valuation would entail a greater tax rate to compensate for the lowered tax base). However, at the time that it is desired to issue more authorized bonds, it is possible that the projected tax rate would exceed the soft tax rate cap in order to pay the debt service of the bonds issued so far and the debt service to be incurred by the issuance of more bonds. Because the projected tax rate would exceed the soft tax rate cap, no more bonds can be issued at that time. For example, the projection of property valuations could decline so much so that even setting the tax rate up to the tax rate cap would not generate enough tax revenue to accommodate the debt service for already issued bonds and the additional debt service associated with further issuance of authorized bonds.

A dilemma imposed by the tax rate cap restriction can be illustrated in the following example: the Shady Oak unified school district utilizes the 55% voter approval procedure to authorize $100 million worth of bonds to finance certain projects. The unified school district then issues $30 million of the authorized bonds in a first series of bond sales. To pay the debt service on the $30 million issued bonds, the tax rate (e.g., determined using the assessed values of property within Shady Oak's district) needs to be set at $56.00 per each $100,000 of property valuation. Some time later, Shady Oak wishes to issue another $25 million of the remaining $70 million of authorized but unissued bonds. However, based on the projection of property valuations at that time, the projected tax rate needed to pay the debt service associated with the already issued $30 million bonds and the additional $25 million bonds to be issued is $80 per each $100,000 of property valuation, which exceeds the $60 per each $100,000 of property valuation tax rate cap applicable to Shady Oak. As a consequence, under the $60 per each $100,000 of property valuation tax rate cap, Shady Oak cannot issue another $25 million bonds at that time without exceeding the tax rate cap. One option for Shady Oak is to wait (e.g., one or more years) until the tax base (e.g., property valuation) increases such that the $25 million of bonds can be issued under circumstances where the projected tax rate will be below the $60 per each $100,000 of property valuation tax rate cap. But waiting until the tax base increases is still speculative and may not be a satisfactory solution for a school district that wishes to issue bonds sooner. A second option is to hold another election for a new and additional approval of bonds. However, holding such an election is politically complicated (e.g., difficult to persuade the voters) if the school district still has unissued bonds from the previous election. A third option for Shady Oak is to consider holding a 55% voter approval election for a reauthorization of unissued bonds, which puts the reauthorized bonds under a new separate tax rate cap.

In some embodiments, the consequence of a reauthorization of a portion of unissued bonds that were initially authorized by a 55% voter approval process is to create another tax rate cap for just the reauthorized bonds. A new tax rate cap is applied to bonds approved at each election. As such, each time bonds are authorized under the 55% voter approval election, the school district receives a tax rate cap for those authorized bonds. So, reauthorized bonds can be thought of as a new authorization of bonds that entails a new tax rate cap. The issued bonds of the previous authorization are still associated with its previous tax rate cap. As a result, bonds issued from the reauthorization are serviced by the tax rate associated with the reauthorization and bonds issued from the previous authorization are serviced by the tax rate associated with the previous authorization. Generally, the tax revenue allocated by the local government for one authorization (e.g., reauthorization) cannot be used to pay for the debt service for bonds from another authorization (e.g., previous authorization). For example, assume that under the previous authorization, further issuance of bonds (at the current time) would cause the projected tax rate to exceed the soft tax rate cap. However, after the approval of a reauthorization of bonds, bonds can be issued under the reauthorization under a new tax rate cap, which is unlikely to be exceeded for the bonds of the reauthorization.

Figure 1:
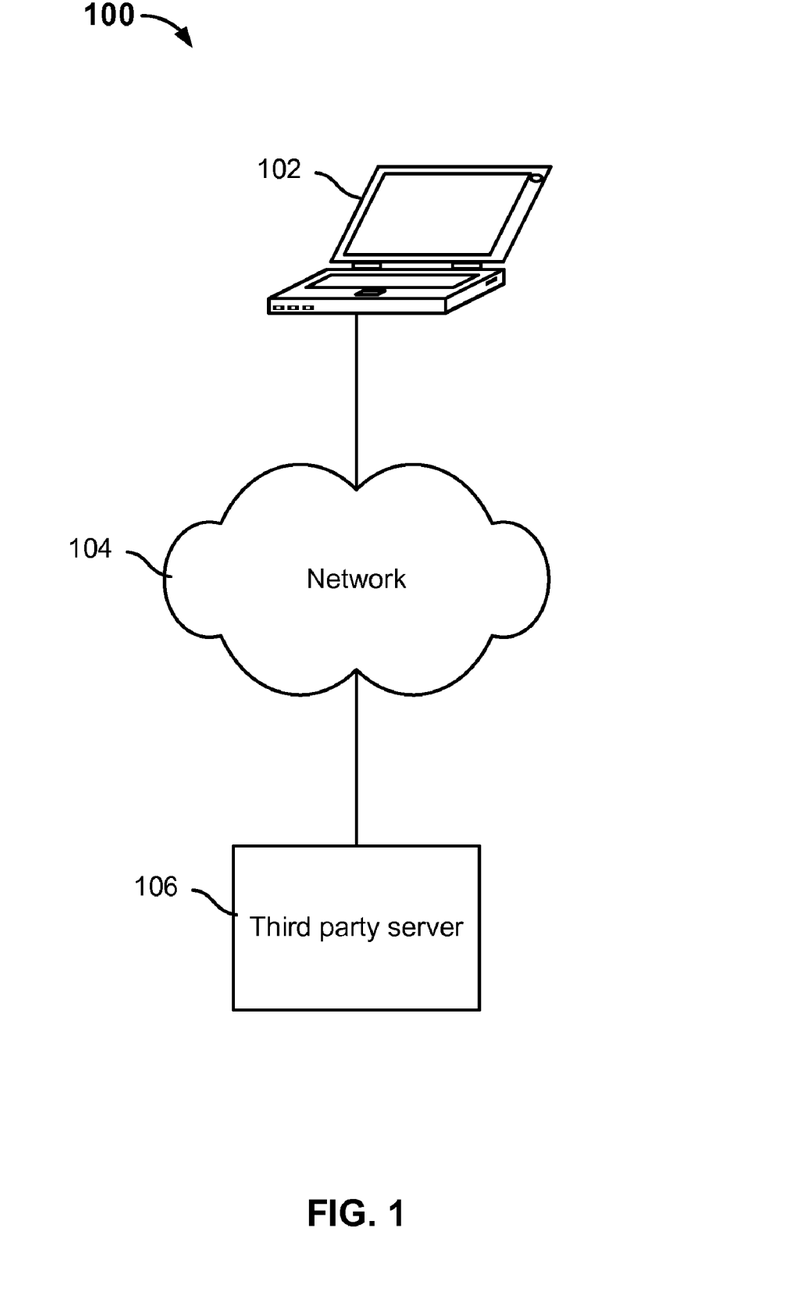
FIG. 1 is a diagram showing an embodiment of a system for determining election reauthorization.

FIG. 1 is a diagram showing an embodiment of a system for determining election reauthorization. System 100 includes device 102, network 104 and third party server 106. In some embodiments, network 104 and/or third party server 106 are optionally part of system 100. Network 104 includes one or more high speed data networks and/or one or more telecommunication networks.

In the example shown, device 102 is configured to receive inputs and determine various calculations. While device 102 is shown to be a laptop, device 102 can be any computer, mobile device, mobile phone (e.g., smart phone), and tablet computer, for example. In various embodiments, device 102 includes a software program (e.g., a commercial spreadsheet application) that is configured to perform calculations, include graphing tools, and/or also support macro programming (e.g., Visual Basic for Applications). Examples of a commercial spreadsheet application include Microsoft Excel and Apple Numbers. Generally, macro programming defines how a certain input sequence should be mapped to an output sequence and can be used to perform automated calculations using inputs of values. Device 102 (or a spreadsheet application installed on device 102) is configured to receive input values including authorization values (e.g., how much bonds were authorized per a 55% voter approval bond election), bonds issued (e.g., per each series under an authorization), principal and/or coupon values on debt service (e.g., over periods of time within a payment schedule), projected valuations (e.g., of utility, secured and/or unsecured property), a bonding capacity associated with a state statutory limit on debt (e.g., including only principal but not interest that is owed), and a tax rate cap (e.g., associated with the school district for which the bonds are authorized per bond election), for example. Using at least some of the input values, device 102 (or a spreadsheet thereof), an available cash flow is calculated for the existing debt service (e.g., for already issued bonds) using the current tax rate cap. Using the calculated available cash flow, it is determined whether a desired amount of authorized but unissued bonds can be accommodated under the current tax rate cap. In the event that the desired amount of authorized but unissued bonds cannot be accommodated under the current tax rate cap, then it is determined whether at least of a portion of remaining unissued bonds from the authorization should be reauthorized.

In some embodiments, device 102 is configured to receive inputs of information and transmit the information to a third party service (e.g., third party service 106) associated with a creating (e.g., printing, publishing, and/or distribution) of election ballot materials. In some embodiments, device 102 includes a software program (e.g., a commercial word processing application) that is configured for the production (e.g., composition, editing, formatting, printing) of any sort of printable material. An example of a commercial word processing application is Microsoft Word. In some embodiments, device 102 (or a word processing application thereof) is configured to receive inputs of information relating to language regarding the legal procedures associated with a reauthorization of bonds that were previously authorized under a 55% voter approval process.

In some embodiments, device 102 is configured to communicate to third party service 106 via network 104. In some embodiments, a user of device 102 can retrieve information (e.g., real estate information) from third party service 106. For example, the user can access a website (e.g., www.dataquick.com) that is supported by a third party service (e.g., a web server) to retrieve information regarding sale prices of real estate is various areas. In another example, the user can access online periodicals (e.g., Moody's, Wall Street Journal) to retrieve financial and economic news. In some embodiments, the information retrieved from third party services contribute to the input value (e.g., projected valuations) entered into the spreadsheet application of device 102.

Figure 2:
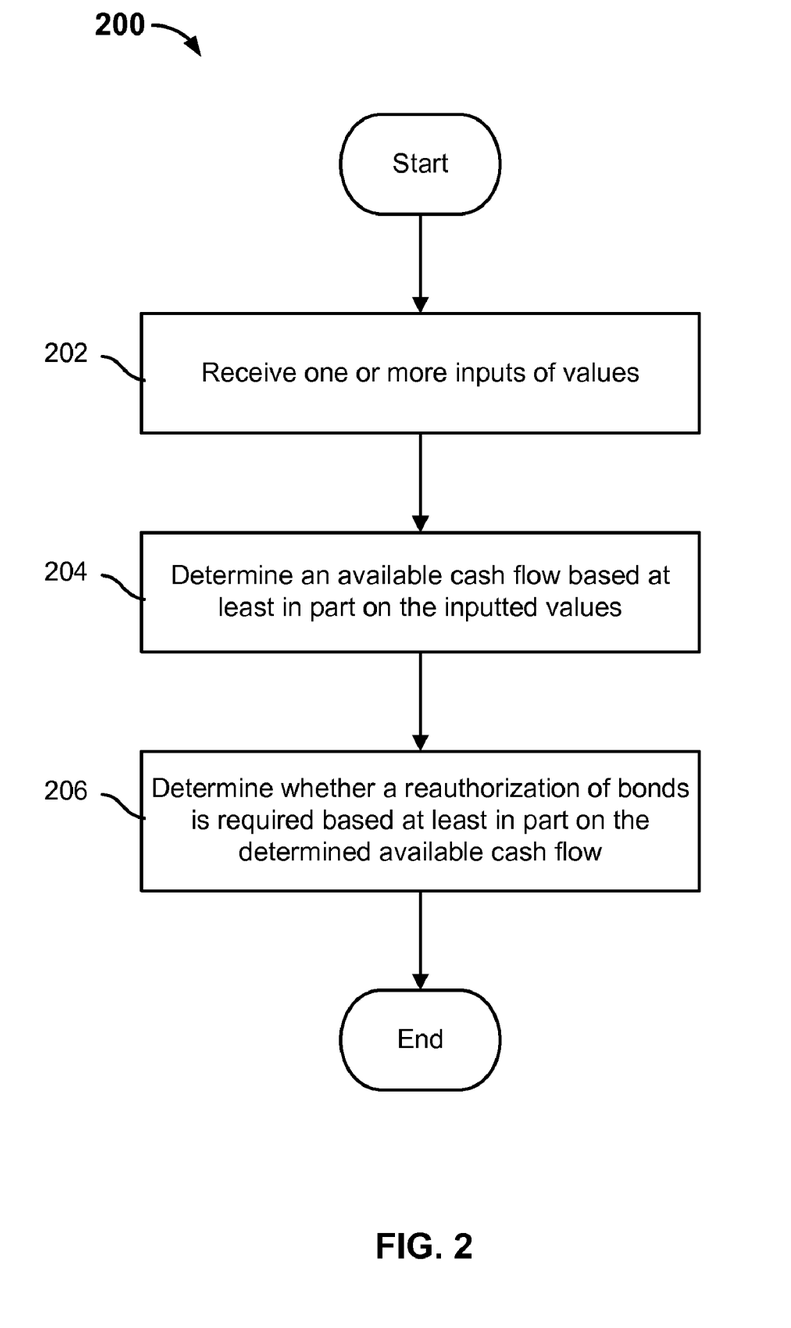
FIG. 2 is a flow diagram showing an embodiment for determining election reauthorization.

FIG. 2 is a flow diagram showing an embodiment for determining election reauthorization. In some embodiments, process 200 can be implemented on system 100.

At 202, one or more inputs of values are received. In some embodiments, the values are input into a device configured with a spreadsheet application. In some embodiments, the spreadsheet application supports macro programming and can automatically perform calculations (e.g., in response to receiving the input values). Examples of input values include one or more of the following: debt service (e.g., principal and coupon rates) to be paid out over time, a bonding capacity associated with a state limit on debt, projected valuations (e.g., utility, local secured properties and unsecured properties), authorization values (e.g., associated with a 55% voter approval process), and a tax rate cap (e.g., per a bond authorization election).

At 204, an available cash flow based at least in part on the inputted values is determined. In some embodiments, at least some of the values input at 202 are input into one or more spreadsheets configured to (e.g., by a macro program) to determine an available cash flow (and one or more intermediate values). In some embodiments, the determined available debt service is a column of one or more values (e.g., corresponding to chronological periods of time) in a spreadsheet. In some embodiments, the available cash flow is the additional tax revenue that can be collected (e.g., in a subsequent year) and is to be used for paying debt service under the current authorization of bonds at the tax rate cap associated with that authorization.

At 206, whether a reauthorization of bonds is required is determined based at least in part on the determined available cash flow. In some embodiments, the determined available cash flow and at least coupon rate(s) are input into one or more spreadsheets that are configured to determine (e.g., by a macro program) a possible amount of one or more bonds (e.g., the debt service thereof) that can be accommodated by that available cash flow. In some embodiments, the output of the one or more spreadsheets includes an estimated amortization schedule. In some embodiments, the outputted estimated amortization schedule includes a table including periodic payments (e.g., each payment includes one or both of principal and interest) in a process of paying off debt service over time through regular payments (e.g., at one or more maturity dates of bonds). In some embodiments, the spreadsheets used to produce the amortization schedule generates flags (e.g., negative principal values) that indicate that a debt service associated with an issuance of bonds (e.g., the principal portion of that debt service) cannot be accommodated by the available cash flow. In the event that a desired debt service cannot be accommodated by the available cash flow, it is determined that a reauthorization of bonds is needed so that, for example, reauthorized bonds can be serviced by a tax rate associated with a separate tax rate cap.

In a bond reauthorization, the school district would stipulate (e.g., in materials related to the ballots of the reauthorization election) that if the reauthorized bonds were approved, it would undertake the legal process to cancel a like portion of the previously approved bonds. Sometimes, the ballot materials may also state that the reauthorized bonds are to be used in new projects or the same projects that were stated for the previous authorization. In a reauthorization of bonds, no additional debt would be authorized by voters because no additional authorization of bonds is created by the reauthorization since the same amount of reauthorized bonds are canceled from the previous authorization. Not only is new debt avoided but the reauthorized bonds would now receive a new, separate tax rate cap. This is in contrast to a new authorization of bonds in a subsequent bond election in which new debt could be created (e.g., if bonds were issued from both the previous authorization and the new authorization).

Returning to the previous example involving Shady Oak unified school district: During a 2006 bond election, Shady Oak unified school district utilizes the 55% voter approval procedure to authorize $100 million worth of bonds to finance certain projects. Shady Oak then issues $30 million of the $100 million authorization in a bond sale. Some time later, Shady Oak wishes to issue another $25 million of the remaining $70 million of the 2006 authorization. However, at this time, the projected tax rate for the total debt service (including the $30 million worth of already issued bonds and the additional $25 million worth of bonds desired to be issued) would be $72 per each $100,000 of property valuation (as calculated using a system like system 100), which exceeds the $60 per each $100,000 of property valuation soft tax rate cap assigned to the unified school district for the 2006 authorization. As a result, Shady Oak cannot issue the additional $25 million bonds under the 2006 authorization at this time.

Because Shady Oak cannot issue the desired $25 million worth of bonds under the 2006 authorization, it decides to engage in a bond election process to reauthorize at least a portion of the remaining $70 million of unissued bonds from the 2006 election. Shady Oak successfully obtains 55% voter approval at an election in 2014 to reauthorize all $70 million worth of unissued bonds previously authorized in 2006. This $70 million is now part of the 2014 authorization and is associated with a new $60 per each $100,000 of property valuation soft tax rate cap. After the 2014 reauthorization, Shady Oak wishes to issue $25 million of the $70 million from the 2014 authorization. At this time, to issue a $25 million, the projected tax rate to accommodate the debt service on the $25 million of the 2014 authorization is $45 per each $100,000 of property valuation. Because $45 per each $100,000 of property valuation is below the tax rate cap, it is possible for Shady Oak to issue $25 million worth of bonds from the reauthorized $70 million (whereas this was not possible under the 2006 authorization).

In some embodiments, an amount of bonds to reauthorize is determined. In some embodiments, the determination of the amount of bonds to reauthorize includes both political and quantitative decisions. Generally, it is advantageous to reauthorize all (rather than only a portion) of the remaining unissued bonds from the previous authorization. This is so that the issuing school district has more flexibility in issuing more bonds before reaching the authorization cap. Also, this allows for a bonding maturity schedule in which more bonds mature sooner. When bonds mature sooner, the debt service payments are completed on those bonds earlier, which results in a shorter payment period and less overall interest accrued on the bonds. Nevertheless, proposing to reauthorize all of the remaining unissued bonds from a previous authorization may be politically difficult to achieve. For instance, voters may not fully understand the difference between a new authorization and a reauthorization of bonds and mistakenly believe that new debt is generated by a reauthorization.

In some embodiments, political decisions involved with determining an amount of bonds to reauthorize could include factors such as how probable it is that voters would reauthorize a certain amount of bonds in the near future, and whether bond reauthorization campaign materials and/or activity can be prepared in time for the election. In some embodiments, quantitative decisions involved with determining an amount of bonds to reauthorize could include factors such as whether all the desired bonds to be issued subsequent to a reauthorization could be serviced by the new tax rate cap, whether it would be advantageous to reauthorize only a portion (as opposed to all) of the unissued bonds from a previous authorization and in the event that only a portion of the unissued bonds are to be reauthorized, whether another new authorization of bonds (e.g., approved using either the two-thirds or 55% voter approval procedures) is desirable, and whether it would be beneficial (from a transactional cost perspective) to reauthorize a portion of the remaining unissued bonds at one election and wait to seek to reauthorize another portion at another election.

Figure 3:
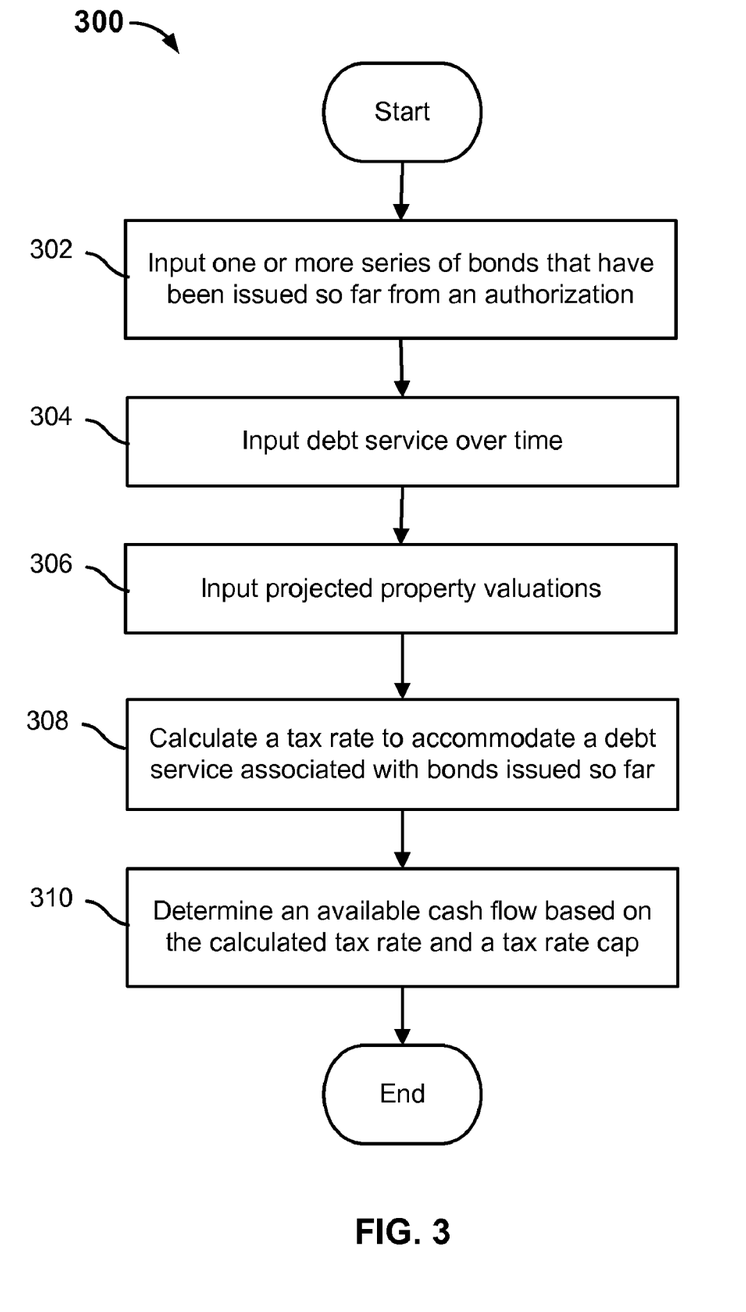
FIG. 3 is a flow diagram showing an embodiment of determining an available cash flow.

FIG. 3 is a flow diagram showing an embodiment of determining an available cash flow. In some embodiments, process 300 is an example of 202 and 204 of process 200. In some embodiments, process 300 can be implemented using system 100.

At 302, one or more series of bonds that has been issued so far from an authorization is input. In some embodiments, one or more series of bonds are input into one or more spreadsheets. During an election, a certain amount of bonds is authorized. In some embodiments, the total amount of bonds that are authorized is referred to as the authorization cap. In some embodiments, the authorized bonds are issued over one or more series, where in each series, a portion of the total amount of authorized bonds is sold. All of the series of bonds do not need to add up to the authorization cap, but the sum cannot exceed the authorization cap. Put another way, authorized bonds can be issued in one or more series (as needed by the school district) up to, but not exceeding, the authorization cap.

At 304, debt service over time is input. In some embodiments, debt service over time is input into one or more spreadsheets as payment schedules over time. In some embodiments, a payment schedule can be made for each series of bonds and/or the combination of all series of bonds under the same authorization. In some embodiments, each payment schedule includes the scheduled (e.g., semi-annual) payment of principal and/or interest over time for one or more types of bonds. In some embodiments, one type of bond pays increments of interest on a regular basis over multiple scheduled payments and another type of bond (e.g., a bond anticipation note) pays the total principal plus compounded interest together as a lump sum over one scheduled payment.

At 306, projected property valuations are input. In some embodiments, projected property valuations are input into one or more spreadsheets. In some embodiments, projected valuations include property within the school district issuing the authorized bonds. In some embodiments, projected valuations are determined based on actual growth in previous years, economic forecasts, data retrieved from third party services, among other factors.

At 308, a tax rate to accommodate a debt service associated with bonds issued so far is calculated. In some embodiments, using at least some the input values, a tax rate is calculated in one or more spreadsheets (e.g., using a macro program). In some embodiments, using at least the debt service (e.g., input at 304), a tax collection or revenue that is required to pay the debt service is calculated. In some embodiments, using at least the projected valuations (e.g., input at 306) as a tax base, a tax rate (e.g., per each $100,000 of projected valuations) needed to satisfy the calculated tax collection required to pay the debt service is calculated.

At 310, an available cash flow based on the calculated tax rate and a tax rate cap is determined. In some embodiments, using the calculated tax rate and a tax rate cap, an available cash flow (e.g., available debt service) is determined. In some embodiments, the tax rate cap is the tax rate cap associated with one 55% voter approval election for a current authorization of bonds for a certain type of school or community college district.

Figure 4:
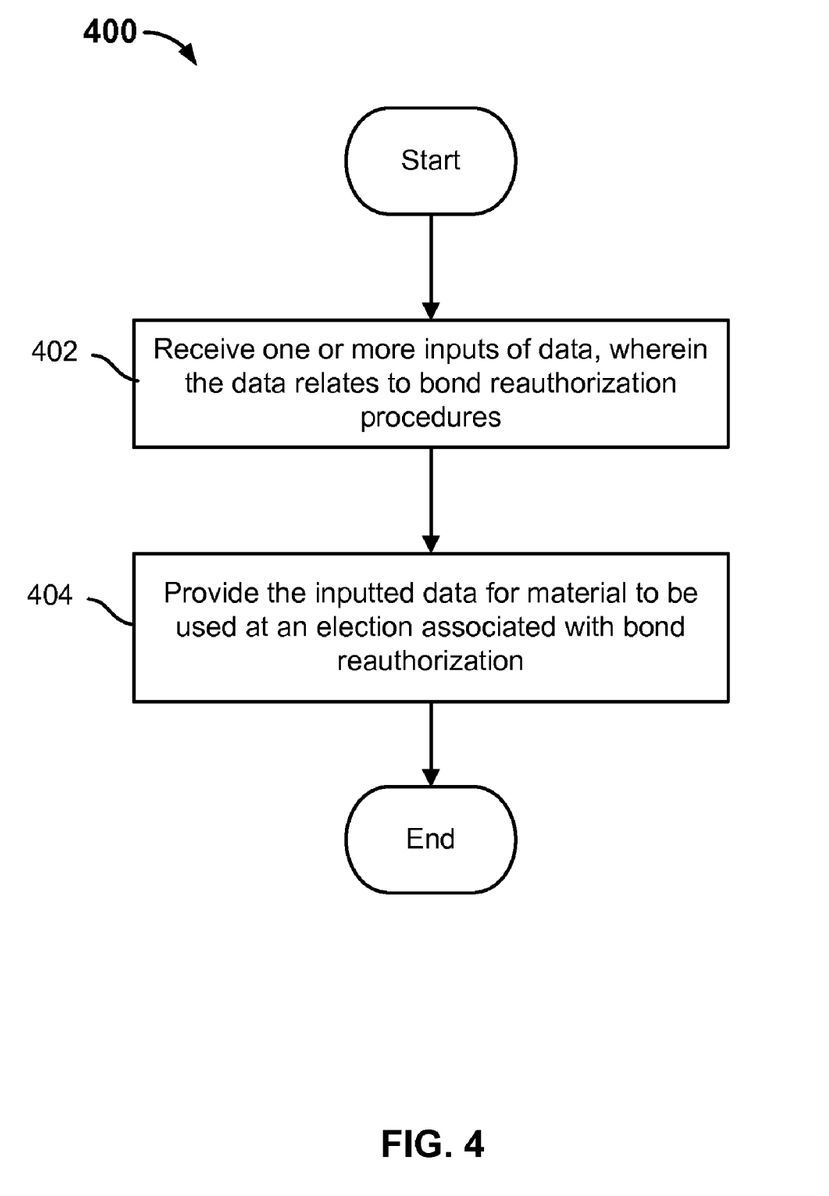
FIG. 4 is a flow diagram showing an embodiment for publishing information related to an election for bond reauthorization.

FIG. 4 is a flow diagram showing an embodiment for publishing information related to an election for bond reauthorization. In some embodiments, process 400 can be implemented using system 100.

In some embodiments, subsequent to the determination of whether a reauthorization of bonds is required (e.g., using process 200), an election for a reauthorization of bonds is to be held. In connection with such an election, the school district would stipulate that, if the reauthorized bonds were approved, it would undertake the legal process to cancel a like portion of the previously approved bonds.

For example, Shady Oak unified school district has used the 55% voter approval procedures to authorize $100 million worth of bonds. The unified school district then issues $30 million of the authorized bonds in a first series of bond sales. Later, Shady Oak wishes to issue another $25 million of the remaining $70 million of authorized but unissued bonds.

However, Shady Oak learns that in order to issue more bonds, it will need to hold an election for a reauthorization of bonds. It is then determined that $70 million of unissued bonds should be reauthorized. In preparation for the election for a reauthorization of bonds, Shady Oak would need to include language in the ballot materials indicating that if the $70 million worth of reauthorized bonds were approved, the school district would then cancel $70 million worth of the previously approved bonds. In some embodiments, Shady Oak could also include language in the ballot materials with regard to any of the same or an addition of projects are to be funded by the bonds of the reauthorization.

At 402, one or more inputs of data are received, wherein the data relates to bond authorization procedures. In some embodiments, a user working on the election for a bond reauthorization inputs characters into a word processing software application describing the legal implications and consequences of a bond reauthorization process. Returning to the previous example, a Shady Oak employee or someone associated with Shady Oak's bond reauthorization election could input the legal language relevant to the legal implications and consequences of a bond reauthorization process (e.g., a portion similar to the reauthorized bonds of previously authorized but unissued bonds would need to be canceled via a legal process).

At 404, the inputted data with respect to material to be used at an election associated with bond reauthorization is provided. In some embodiments, then inputted data is then provided to an online website associated with the upcoming election for bond reauthorization and/or transmitted to a third party service to print the input data onto ballot materials related to the election.

Figure 5:
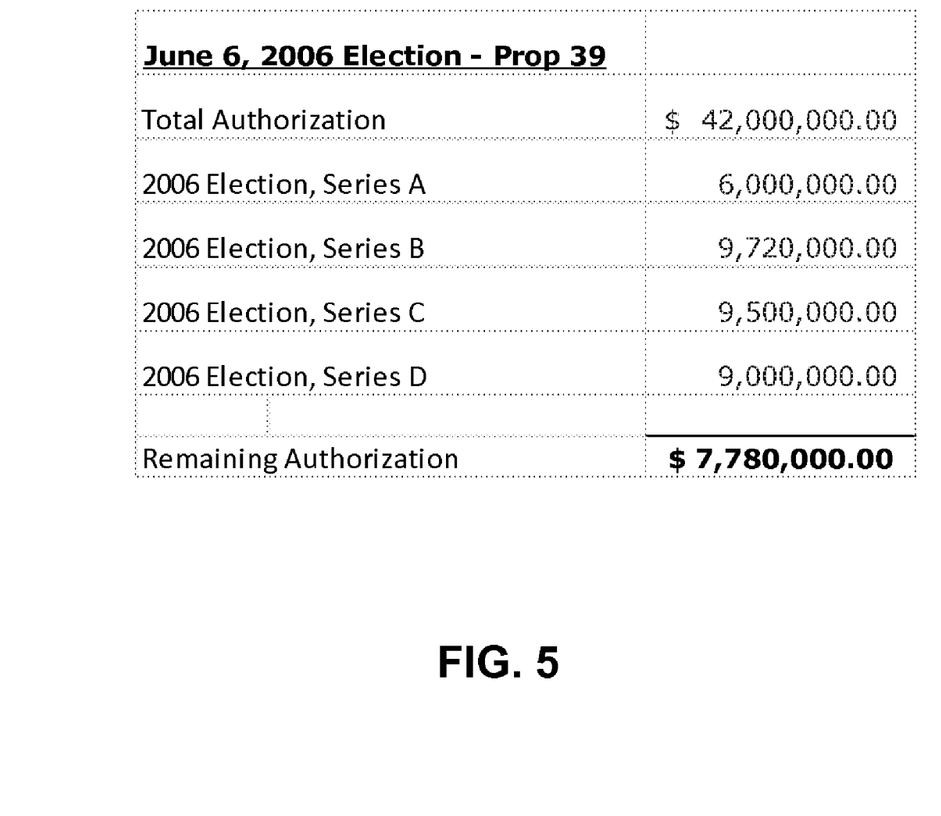
FIG. 5 is a table showing an example of series of bonds associated with an authorization.

FIG. 5 is a table showing an example of series of bonds associated with an authorization. In some embodiments, the values of the table of FIG. 5 are inputted. The election in which the authorization of bonds are shown in the example was the Jun. 6, 2006 Election that took place using the 55% voter approval procedures of Prop 39. As shown in the example, the total amount of bonds authorized by that election (e.g., "Total authorization") was $42 million. The total amount of bonds authorized by that election is, in some embodiments, referred to as the authorization cap such that the aggregate of bonds sold from that authorization is limited to the authorization cap. Also as shown in the example, four series of bond sales took place and in each series, a portion of the total authorization was sold. In Series A, $6 million of the authorized bonds were sold; in Series B, $9.72 million of the authorized bonds were sold, in Series C, $9.5 million of the authorized bonds were sold; and in Series D, $9 million of the authorized bonds were sold. In the example, after bonds sales from series A through D, $7.78 million of the $42 million authorized bonds remain unissued. As more series of bonds under this Jun. 6, 2006 authorization are issued, the table of FIG. 5 can be referenced to make sure that the aggregate of bonds issued does not exceed the authorization cap of $42 million.

FIG. 6 is a spreadsheet showing examples of payment schedules of debt service on issued bonds in accordance with some embodiments. In general, the payment schedules of FIG. 6 show when (e.g., at semi-annual intervals) and what (e.g., principal and/or interest) to pay out. The rows of the spreadsheet indicate dates on which interest and/or principal is due. In this example, the dates in the rows range from Feb.-1-2011 to August-1-2019, with a row entry for every six months (e.g., either February or August of a year). The columns of the spreadsheet indicate principal and interest for different types of bonds from different series (the super columns of "2006 Election Series A" and "2006 Election Series B") and also total debt service amounts that are broken out in different forms (the three rightmost columns of "Total Debt Service," "Total Fiscal Debt Service," and "Total Annual Debt Service") for reporting and other reasons. In some embodiments, the values in the "Principal" columns are input and the values under "Interest" are calculated by the spreadsheet (e.g., using at least the inputted coupon rates). In some embodiments, the total debt service columns are sums automatically calculated by the spreadsheet. In some embodiments, calculations by the spreadsheet are performed using, for example, functionalities of the spreadsheet software and/or programmed macros.

In the example of FIG. 6, there are payment schedules for bonds issued in two series of the 2006 Election Authorization: Series A and Series B. As shown in the example, for a series of bonds, different pieces can mature at different times. Under each series, there are one or more types of bonds. For Series A, there are two types of bonds: Current Interest Bond (CIB) and Capital Appreciation Bond (CAB). For series B, there is only one type: CIB. As shown in the example, one way in which the CIB and CAB types of bonds differ is in the schedule of pay out of principal and interest. For the CIB bonds of this example, interest is paid out at regular intervals (e.g., twice a year during February and August) and the principal is paid out upon the maturity date (e.g., during August of the year in which the bond matures). In comparison, CAB bonds of this example, do not pay semiannual interest payments and instead, compound the interest semi-annually and yield a lump sum payment that includes the principal and the compounded interest upon the maturity date. In some embodiments, both CAB and CIB bonds can mature up to 40 years from their times of issuance. In some embodiments, one or both of CAB and CIB bonds can be used to structure bond anticipation notes. Generally, bond anticipation notes do not pay semiannual interest payments and instead, compound the interest semi-annually and produces a lump sum payment including the principal and compounded interested upon the maturity date (e.g., the CAB bonds of this example). In some embodiments, the principal and compounded interest of bond anticipation notes are paid off using the proceeds from bond sales. In some embodiments, the payment schedule for each series of bonds can be broken out into separate spreadsheets.

Figure 7:
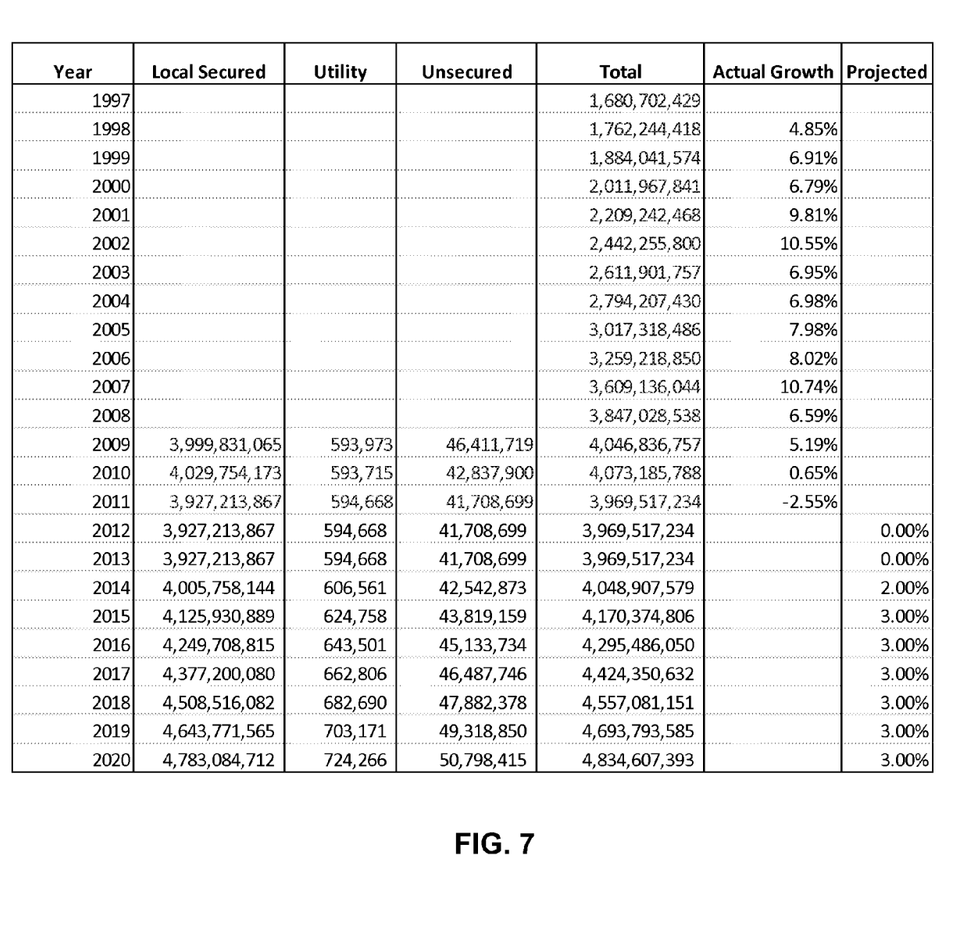
FIG. 7 is an example spreadsheet including assessed valuations in accordance with some embodiments.

FIG. 7 is an example spreadsheet including assessed valuations in accordance with some embodiments. In some embodiments, the values of the spreadsheet including assessed valuation in accordance with some embodiments are input. In the spreadsheet of FIG. 7, the rows indicate years for which the assessed valuations are made. In this example, the dates in the rows range from the year 2009 to the year 2020, with a row entry for each year. The assessed valuations are of properties within the school district issuing the bonds. The properties assessed in the example make up the columns (starting from second leftmost column of the spreadsheet) of "Local Secured," "Utility," and "Unsecured." The spreadsheet of FIG. 7 shows both actual (historical) assessed valuations and projected future assessed valuations. For years that have passed (e.g., 1997 to 2011 in the example), the input values (if available) reflect the actual assessment of property valuations (for each of the "Local Secured," "Utility," and "Unsecured" columns), the actual total of assessed valuations (for the fifth column from the left, "Total") and a percentage of actual growth from the previous year (for the sixth column from the left, "Actual Growth"). In various embodiments, the actual assessments of property valuations are retrieved from third party services and/or public records.

For years that have not yet passed (e.g., 2012 to 2020 in the example), the input values (if available), reflect the projected assessed valuations (for each of the "Local Secured," "Utility," and "Unsecured" columns), the projected total of assessed valuations (for the "Total" column") and a percentage of projected growth from the previous year (for the "Projected" column). In various embodiments, for the projected assessed valuations, the projections are made based upon reasonable assumptions whereupon various factors are considered. For example, the projections are made based on actual growth of property within the district from previous years, actual growth of property from other regions of the country, economic forecasts/indicators, expert analyses, information retrieved from third party services (e.g., from the Dataquick website), among others.

FIG. 8 is a spreadsheet showing an example of calculating bonding capacity in accordance with some embodiments. In some embodiments, bonding capacity refers to a state statutory limit on debt (including principal but not interest). For the state of California, the bonding capacity, as a percentage of assessed value of all taxable property, is 2.5% for unified school districts and 1.25% for other school districts. Bonding capacity refers to all bonds issued and is not limited to only bonds passed using the 55% voter approval procedure.

In the example of FIG. 8 is a spreadsheet for a unified school district and so the appropriate bonding capacity is 2.5%. The rows of the spreadsheet indicate the time over which bonds mature/debt service is paid. In the example shown, the row entries range from Feb.-1-2005 to August-1-2015, with a row entry for every consecutive six months. The columns of the example spreadsheet, from left to right, are "Before" (which corresponds to the dates of the row entries), "Assessed Valuation," "Gross Bonding Capacity," "Outstanding Principal," and "Net Remaining Bonding Capacity." In this example, the bonding capacity of 2.5% and values of the column of "Assessed Valuation" are input to calculate the values of the columns of "Gross Bonding Capacity," "Outstanding Principal" and "Net Remaining Bonding Capacity." The values in the column of "Assessed Valuation" can be taken from a spreadsheet such as the one shown in FIG. 7. Each value of the "Gross Bonding Capacity" column is automatically calculated based on the bonding capacity of 2.5% multiplied by the "Assessed Valuation" value of the same row. Each value of the "Outstanding Principal" column is a sum of all remaining outstanding principal (e.g., as referenced from a different spreadsheet). Each value of the "Net Remaining Bonding Capacity" column is the difference between the values from the "Gross Bonding Capacity" and "Outstanding Principal" from the same row. The values of the "Net Remaining Bonding Capacity" column refers to a state imposed limit on the outstanding debt of principal (and not including interest) of issued bonds. One purpose for maintaining the bonding capacity spreadsheet is to make sure that the state statutory debt limit is not exceeded. Should or if it is possible that the "Net Remaining Bonding Capacity" be exceeded by a subsequent issuance of bonds, then a waiver application must be submitted to the California State Department of Education to seek a percentage extension above the statutory limit.

Figure 9:
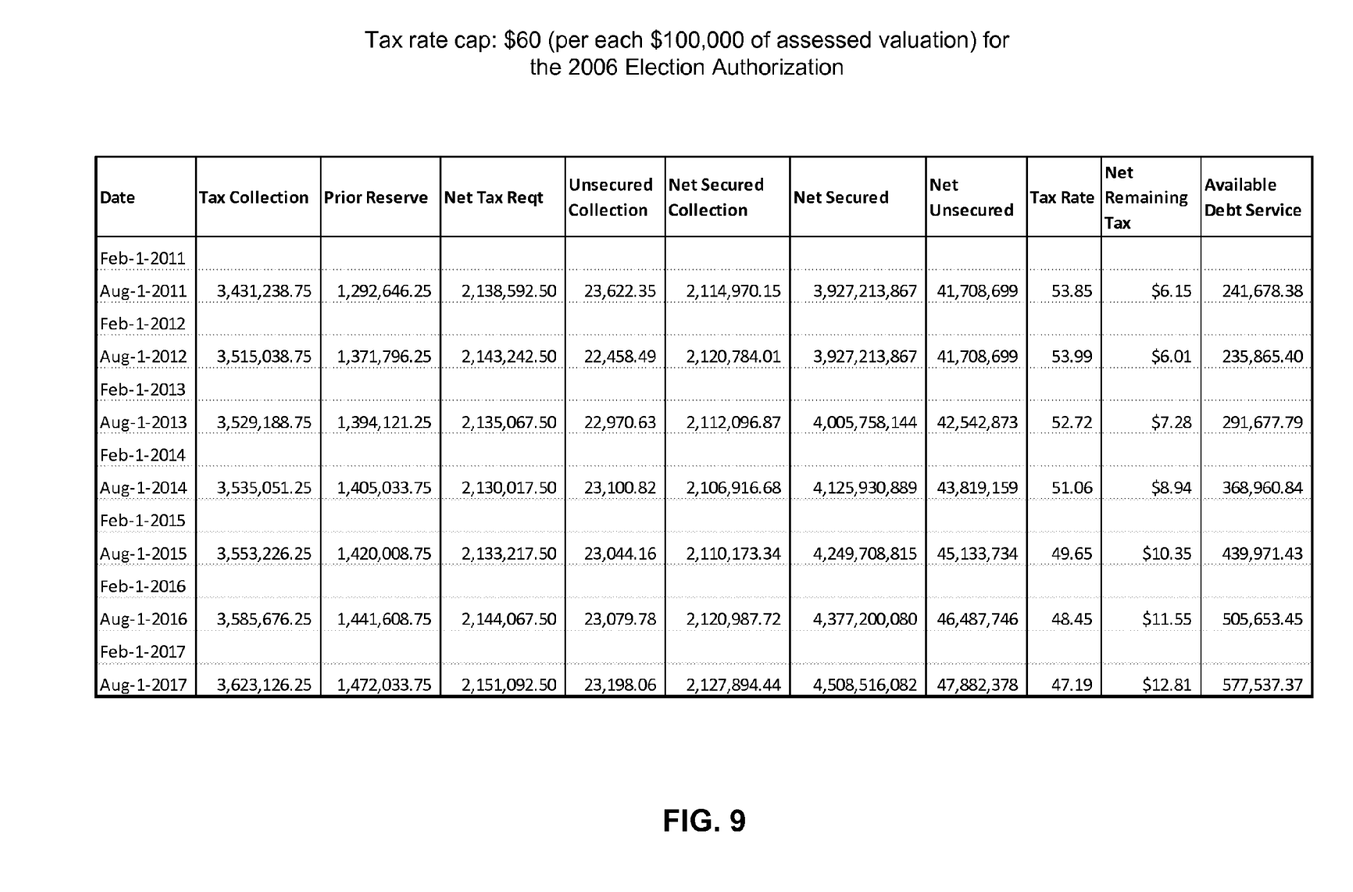
FIG. 9 is a spreadsheet showing an example of calculating available cash flow in accordance with some embodiments.

FIG. 9 is a spreadsheet showing an example of calculating available cash flow in accordance with some embodiments.

In the example of FIG. 9, the entity (e.g., school district) for which the calculations are done is a unified school district, which has a tax rate cap of $60 per each $100,000 of assessed valuation. In some embodiments, the tax rate cap of $60 is input into (e.g., a cell at) the spreadsheet or otherwise referenced by the spreadsheet (although that is not shown in the example of FIG. 9). In this example, the rows of the spreadsheet indicate maturity dates of bonds and therefore when debt service payments must be made. In this example, the dates of the rows range from Feb.-1-2011 to August-1-2017. In this example, the columns, from left to right of the spreadsheet, are "Date," "Tax Collection," "Prior Reserve," "Net Tax Reqt," "Unsecured Collection," "Net Secured Collection," "Net Secured," "Net Unsecured," "Tax Rate," "Net Remaining Tax Rate," and "Available Debt Service." The values of the "Tax Collection" column are the tax revenue needed to be collected (e.g., for each 18 months period) to pay off the debt service owed for the year of the corresponding row. The values of the "Prior Reserve" are the projected tax revenue to be leftover (e.g., after debt service and other expenses were paid out) from the previous year. The values of the "Net Tax Reqt" column are the tax revenue needed to pay off the debt service owed for the year of the corresponding row after the prior reserve has been accounted for (i.e., the values of the "Net Tax Reqt" is the difference between the values of the "Tax Collection" and "Prior reserve" columns). The values of the "Unsecured Collection," "Net Secured Collection," "Net Secured," and "Net Unsecured" columns are based on assessed valuations (e.g., as taken from a spreadsheet such as FIG. 7) of secured and unsecured property. In some embodiments, taxes are collected differently (e.g., by the local government) for secured and unsecured property. For example, taxes on secured property are collected during the same year for which they are used to pay debt service while taxes on unsecured property are collected during a year but used to pay debt service the following year.

The values of the "Tax rate" column are the projected tax rates on the assessed property valuations (of the corresponding year) that are necessary to yield the tax revenue required to pay for the debt serviced owed that year. The values of the "Net Remaining Tax" column are the differences between the tax rate cap of $60 and the calculated values of the "Tax rate" column (i.e., each value in the "Net Remaining Tax" column is the difference between the $60 tax rate cap and the corresponding, calculated value of the "Tax rate" column). In some embodiments, the values of the "Net Remaining Tax" represent the margin between the projected tax rate and the tax rate cap. This margin is then used to calculate the available cash flow for each year in the "Available Debt Service" column. The values of the "Available Debt Service" column are the available cash flow for each year based on the calculated values of assessed property valuations and the values of the "Net Remaining Tax" column. In some embodiments, the available cash flow for a year represents the potential of tax revenue (e.g., used to pay for an increase in debt service created by an additional issuance of bonds) that can be generated up until the tax rate cap is met. In various embodiments, the available cash flow is then used, along with coupon rates (e.g., determined on current market rates), to determine whether a desired amount of additional bonds may be accommodated by the current authorization and its tax rate cap (e.g., the issuance of more bonds could increase the debt service up to a point where the corresponding projected tax rate needed to pay for the debt service exceeds the tax rate cap). If the desired amount of additional bonds under the current authorization cannot be accommodated by the tax rate cap, then a reauthorization of bonds is needed to obtain a new tax rate cap for those bonds to be issued under the reauthorization. By obtaining a new tax rate cap for bonds to be issued after the reauthorization, the net remaining tax (e.g., margin between the projected tax rate and the tax rate cap) used to determine the available cash flow is recalculated for only the bonds issued after the reauthorization.

Figure 10:
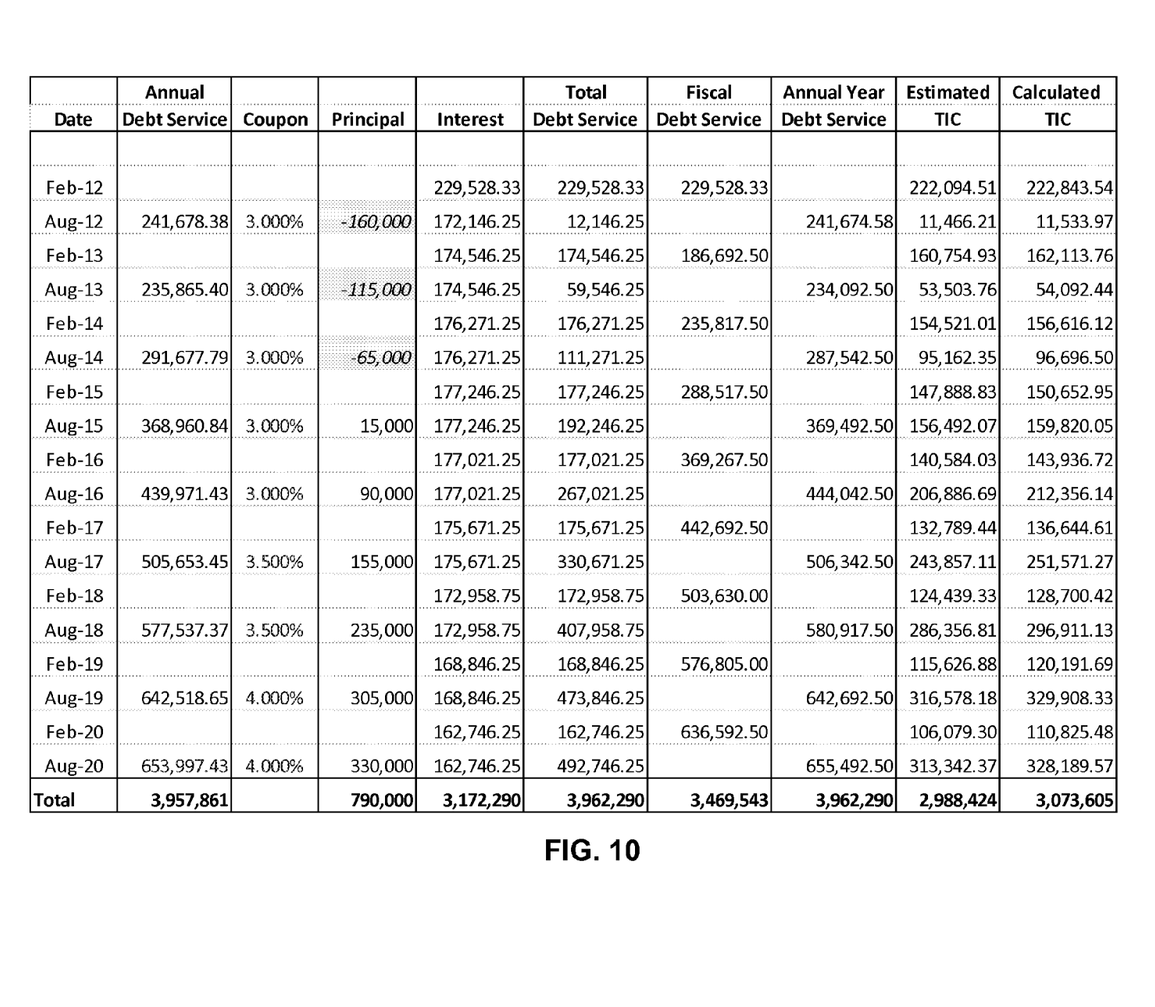
FIG. 10 is a spreadsheet showing an example of an estimated amortization schedule associated with an issuance of bonds in accordance with some embodiments.

FIG. 10 is a spreadsheet showing an example of an estimated amortization schedule associated with an issuance of bonds in accordance with some embodiments. In some embodiments, a spreadsheet such as the example of FIG. 10 is used to determine (an estimate) of the amount of bonds that can be issued under the current authorization using the available cash flow. In this example, the rows indicate maturity dates and dates in which interest on the bonds need to be paid out. In this example, the dates of the rows range from February-12 to Aug.-20, with a row entry for every consecutive six months. In this example, the columns, from left to right, are "Date," "Annual Debt Service," "Coupon," "Principal," "Interest," "Total Debt Service," "Fiscal Debt Service," "Annual Year Debt Service," "Estimated TIC," and "Calculated TIC." In the "Annual Debt Service" column, the projected available cash flow values are input (e.g., as taken from the "Available Debt Service" column of the spreadsheet of FIG. 9). In the "Coupon" column, the coupon rates associated with maturing bonds are input. In some embodiments, the coupon rates are determined based on current market rates such as coupon rates associated with other bonds (e.g., issued by other school districts or various municipalities in various regions of the country). The columns of "Principal" and "Interest" are automatically calculated by the spreadsheet (e.g., using a programmed macro) using the corresponding input values of "Annual Debt Service" and "Coupon." As shown in the example, and as in some embodiments, when the available cash flow (as indicated by the "Annual Debt Service") values are not sufficient to pay the debt service for the estimated principal and interest (as based on the inputted coupon rates), an indication of this possible need for a bond reauthorization can appear as, for example, the one or more cells of the "Principal" column showing up as a negative value and also the cell showing up in a specified color (e.g., see the "−160,000" value under "Principal" that corresponds to the Aug.-12 date). While not shown in the example, and as in some embodiments, when the available cash flow values are sufficient to pay the debt service on the estimated principal and interest, then all of the cells of the "Principal" column appear as a zero or higher value. For example, the calculated values of the "Principal" column can be adjusted such as by reducing the principal amounts in cells in rows subsequent to the cells containing negative values. By reducing the total principal value (i.e., the total amount of additional bonds to be issued with the available cash flow of the current authorization), it may be determined that the available cash flow is sufficient to service an issuance of a particular amount of additional bonds (e.g., all of the cells of the "Principal" column appear as a zero or higher value). This particular amount of additional bonds that can be accommodated by the available cash flow under the current authorization would appear as the value in the "Total" row of the "Principal" column. However, if this particular amount of additional bonds that can be accommodated by the available cash flow under the current authorization is less than a desired amount by the issuing school district, then it is determined that a reauthorization is needed.

The "Total Debt Service," "Fiscal Debt Service" and "Annual Year Debt Service" columns are calculated using various values (e.g., corresponding to different time periods) from the "Principal" and/or "Interest" columns. The "Estimated TIC" and "Calculated TIC" columns represent two calculations of True Interest Costs based on the calculated debt services.

Determining election reauthorization provides the benefit of allowing a bond issuing entity (e.g., school district) to structure a bond issuance favorably and flexibly, while still using the lower bond approval threshold as allotted by Prop 39.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
 a computer processor;
 a computer memory, communicatively coupled to the computer processor, the computer memory storing instructions which, when executed by the computer processor, perform a method, the method comprising:
  receiving information pertaining to a previous bond authorization, wherein the information comprises a tax rate cap and an amount of bonds issued from the previous bond authorization;
  receiving additional information pertaining to an additional amount of bonds to be issued;
  calculating a projected tax rate for a sum of the total debt service of the amount of bonds issued and the additional amount of bonds to be issued, wherein the calculation is based on projected property valuations, wherein the projected property valuations are based on a plurality of factors including at least an actual growth rate of properties, an economic indicator, and an information retrieved from a third party service;
  determining that the calculated projected tax rate is greater than the tax rate cap of the previous bond authorization;
  determining a bond reauthorization amount based at least in part on the additional amount of bonds to be issued, the calculated projected tax rate, and the tax rate cap, wherein the determination calculates a new projected tax rate for the bond reauthorization amount, based at least in part on the projected property valuations, wherein the new projected tax rate is below the tax rate cap; and
  cancelling, from the previous bond authorization, an amount of bonds based at least in part on the determined bond reauthorization amount.

2. The system of claim 1, further comprising calculating an estimated tax rate for the amount of bonds issued from the previous bond authorization.

3. The system of claim 2, further comprising determining an available cash flow based at least in part on the estimated tax rate for the amount of bonds issued from the previous bond authorization.

4. The system of claim 3, further comprising calculating an amortization schedule associated with an estimated amount of bonds that can be accommodated by the tax rate cap associated with the previous bond authorization based at least in part on the available cash flow.

5. The system of claim 1, wherein determining the bond reauthorization amount includes determining a new available cash flow based at least in part on the tax rate cap associated with a reauthorization of bonds.

6. The system of claim 1, further comprising determining that an aggregate amount of bonds including the amount of bonds issued from the previous bond authorization and the bond reauthorization amount does not exceed a limit associated with the previous bond authorization.

7. A method, comprising:
 receiving, by a computer system, information pertaining to a previous bond authorization, wherein the information comprises a tax rate cap and an amount of bonds issued from the previous bond authorization, wherein the computer system comprises at least a computer processor and a computer memory;

receiving, by the computer system, additional information pertaining to an additional amount of bonds to be issued;

calculating, by the computer system, a projected tax rate for a sum of the total debt service of the amount of bonds issued and the additional amount of bonds to be issued, wherein the calculation is based on projected property valuations, wherein the projected property valuations are based on a plurality of factors including at least an actual growth rate of properties, an economic indicator, and an information retrieved from a third party service;

determining, by the computer system, that the calculated projected tax rate is greater than the tax rate cap of the previous bond authorization;

determining, by the computer system, a bond reauthorization amount based at least in part on the additional amount of bonds to be issued, the calculated projected tax rate, and the tax rate cap, wherein the determination calculates a new projected tax rate for the bond reauthorization amount, based at least in part on the projected property valuations, wherein the new projected tax rate is below the tax rate cap; and cancelling, by the computer system, from the previous bond authorization, an amount of bonds based at least in part on the determined bond reauthorization amount.

8. The method of claim 7, further comprising calculating an estimated tax rate for the amount of bonds issued from the previous bond authorization.

9. The method of claim 8, further comprising determining an available cash flow based at least in part on the estimated tax rate for the amount of bonds issued from the previous bond authorization.

10. The method of claim 9, further comprising calculating an amortization schedule associated with an estimated amount of bonds that can be accommodated by the tax rate cap associated with the previous bond authorization based at least in part on the available cash flow.

11. The method of claim 7, wherein determining the bond reauthorization amount includes determining a new available cash flow based at least in part on the tax rate cap associated with a reauthorization of bonds.

12. A computer program product, the computer program product being embodied in a non-transitory computer readable storage medium and comprising computer instructions, which, when executed by a computer processor, perform a method, the method comprising:

receiving information pertaining to a previous bond authorization, wherein the information comprises a tax rate cap and an amount of bonds issued from the previous bond authorization;

receiving additional information pertaining to an additional amount of bonds to be issued;

calculating a projected tax rate for a sum of the total debt service of the amount of bonds issued and the additional amount of bonds to be issued, wherein the calculation is based on projected property valuations, wherein the projected property valuations are based on a plurality of factors including at least an actual growth rate of properties, an economic indicator, and an information retrieved from a third party service;

determining that the calculated projected tax rate is greater than the tax rate cap of the previous bond authorization;

determining a bond reauthorization amount based at least in part on the additional amount of bonds to be issued, the calculated projected tax rate, and the tax rate cap, wherein the determination calculates a new projected tax rate for the bond reauthorization amount, based at least in part on the projected property valuations, wherein the new projected tax rate is below the tax rate cap; and cancelling, from the previous bond authorization, an amount of bonds based at least in part on the determined bond reauthorization amount.

13. The computer program product of claim 12, further comprising calculating an estimated tax rate for the amount of bonds issued from the previous bond authorization.

14. The computer program product of claim 13, further comprising determining an available cash flow based at least in part on the estimated tax rate for the amount of bonds issued from the previous bond authorization.

15. The computer program product of claim 14, further comprising calculating an amortization schedule associated with an estimated amount of bonds that can be accommodated by the tax rate cap associated with the previous bond authorization based at least in part on the available cash flow.

16. The computer program product of claim 12, wherein determining the bond reauthorization amount includes determining a new available cash flow based at least in part on the tax rate cap associated with a reauthorization of bonds.

17. The method of claim 7, further comprising determining that an aggregate amount of bonds including the amount of bonds issued from the previous bond authorization and the bond reauthorization amount does not exceed a limit associated with the previous bond authorization.

18. The computer program product of claim 12, further comprising determining that an aggregate amount of bonds including the amount of bonds issued from the previous bond authorization and the bond reauthorization amount does not exceed a limit associated with the previous bond authorization.

* * * * *